United States Patent
Anderson

(10) Patent No.: US 9,278,727 B2
(45) Date of Patent: Mar. 8, 2016

(54) ELECTRIC PROPULSION CONTROL SYSTEM

(71) Applicant: Ford Global Technologies, LLC, Dearborn, MI (US)

(72) Inventor: Ronald L. Anderson, Newport Beach, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/280,028

(22) Filed: May 16, 2014

(65) Prior Publication Data

US 2015/0329172 A1  Nov. 19, 2015

(51) Int. Cl.
- *B62D 61/02* (2006.01)
- *B62M 6/50* (2010.01)
- *B62M 1/10* (2010.01)
- *B62M 7/12* (2006.01)
- *B62M 6/45* (2010.01)
- *B62M 6/55* (2010.01)

(52) U.S. Cl.
CPC . *B62M 6/50* (2013.01); *B62M 1/10* (2013.01); *B62M 7/12* (2013.01); *B62K 2204/00* (2013.01); *B62M 6/45* (2013.01); *B62M 6/55* (2013.01)

(58) Field of Classification Search
CPC . B62K 2204/00; B62K 2202/00; B62M 7/12; B62M 6/50; B62M 6/45; B62M 6/55
USPC ......................................................... 180/220
See application file for complete search history.

(56) References Cited

U.S. PATENT DOCUMENTS

| | | | |
|---|---|---|---|
| 4,662,644 A * | 5/1987 | Nelson | B62M 23/02 180/205.1 |
| 6,979,013 B2 | 12/2005 | Chen | |
| 8,496,084 B2 * | 7/2013 | Takamura et al. | 180/335 |
| 8,840,127 B2 * | 9/2014 | Musgrove | 280/261 |
| 2004/0198561 A1 * | 10/2004 | Corbalis et al. | 482/57 |
| 2011/0160945 A1 * | 6/2011 | Gale | B60L 3/0023 701/22 |
| 2011/0266082 A1 | 11/2011 | Yang | |
| 2012/0202649 A1 | 8/2012 | Huber | |
| 2013/0081892 A1 * | 4/2013 | Kronfeld et al. | 180/210 |
| 2014/0081494 A1 * | 3/2014 | Chun et al. | 701/22 |
| 2015/0060176 A1 * | 3/2015 | Paick | 180/208 |

FOREIGN PATENT DOCUMENTS

| | | |
|---|---|---|
| CN | 2825435 Y | 10/2006 |
| CN | 202272147 U | 6/2012 |
| CN | 202624561 U | 12/2012 |
| CN | 103419889 A | 12/2013 |

(Continued)

OTHER PUBLICATIONS

GB Search Report for Application No. GB1508181.3 dated Nov. 11, 2015.

*Primary Examiner* — Joseph Rocca
*Assistant Examiner* — Marlon Arce
(74) *Attorney, Agent, or Firm* — Frank MacKenzie; Bejin Bieneman PLC

(57) ABSTRACT

A bicycle includes at least one pedal and a flywheel. The flywheel rotates in accordance with movement of the pedal. A motor is configured to rotate a wheel. A battery powers the motor, and a throttle controls how much power is provided from the battery to the motor. Power from the battery is only provided to the motor while the flywheel is rotating.

17 Claims, 3 Drawing Sheets

(56) References Cited

FOREIGN PATENT DOCUMENTS

| | | |
|---|---|---|
| EP | 2176117 B1 | 3/2011 |
| KR | 20110050806 A | 5/2011 |
| WO | WO 2012/104810 A1 | 8/2012 |
| WO | 2015128818 A | 9/2015 |

* cited by examiner

ELECTRIC PROPULSION CONTROL SYSTEM

BACKGROUND

Bicycles help relieve traffic in congested urban areas. Typically, it is easier to maneuver through a crowded area with a bicycle than with a car or truck. Pedaling a bicycle, however, can be tiring over longer distances. While electric bicycles provide some relief for riders who need to travel a long distance, some municipalities restrict the use of fully electric bicycles. Examples of restrictions include limiting operation of the electric bicycle to particular areas, limiting permitted speed under electric power, requiring riders of electric bicycles to acquire a special license or permit, or the like. These restrictions may be inconvenient for the rider and could discourage use of electric bicycles in the municipality.

DETAILED DESCRIPTION

A bicycle that can be simultaneously operated under both human and battery power may help relieve riders of the burden of pedaling a bicycle over long distances. To prevent the bicycle from being classified as a "fully electric bicycle," the battery power may only assist the rider while the rider is pedaling the bicycle. An exemplary bicycle that is human powered and can simultaneously operate under both human and electric power includes pedals and a flywheel. The flywheel rotates in accordance with movement of the pedals. A motor is configured to rotate a wheel. A battery powers the motor, and a throttle controls how much power is provided from the battery to the motor. Power from the battery is only provided to the motor while the flywheel is rotating. For instance, the flywheel may include a generator that generates a rotation signal indicating that the flywheel is rotating. The rotation signal may be received by a relay that may close to allow power to flow from the battery to the motor. The power flow to the motor will stop when the flywheel stops.

The bicycle shown in the FIGS. may take many different forms and include multiple and/or alternate components and facilities. The exemplary components illustrated are not intended to be limiting. Indeed, additional or alternative components and/or implementations may be used.

Figure 1:
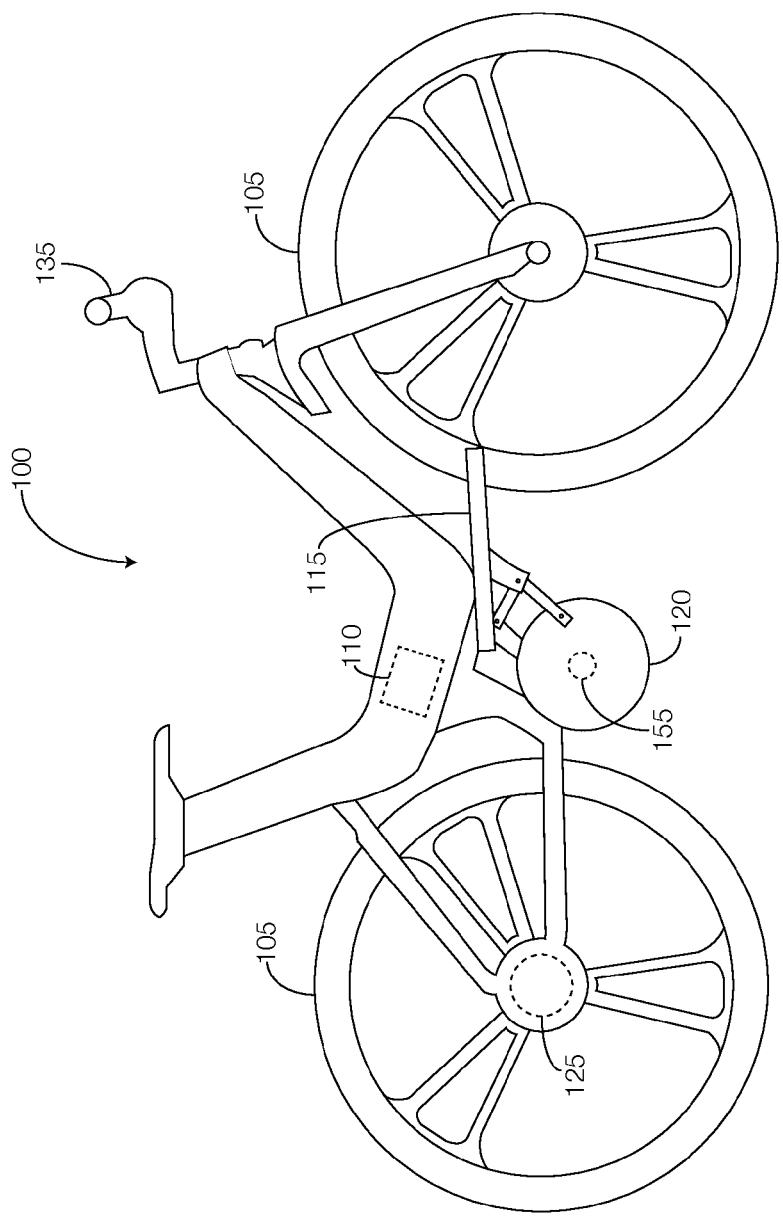
FIG. 1 illustrates an exemplary bicycle configured to simultaneously operate under both human and electric power.

As illustrated in FIG. 1, the bicycle 100 may be configured to operate in a combined mode. Operating in the combined mode includes simultaneously operating in a human-powered mode and a battery 110-powered mode. Thus, while the rider is pedaling the bicycle 100, a power source may simultaneously electrically power the wheels 105. The power source may include a battery 110. The user may pedal the bicycle 100 by providing a force to bicycle pedals 115 operably connected to a flywheel 120. Power from the battery 110 may be provided to a motor 125 while the flywheel 120 is rotating (i.e., while the rider is pedaling the bicycle 100). The motor 125 may be configured to drive one or more wheels 105 in accordance with an electric current received from the battery 110, and in some instances, from the flywheel 120 as discussed in greater detail below. The power output by the battery 110 may be controlled by a throttle 130. The throttle 130 may be disposed on the handlebars 135, and the rider may control the power output of the battery 110 by rotating the throttle 130 as discussed in greater detail below.

Figure 2A:
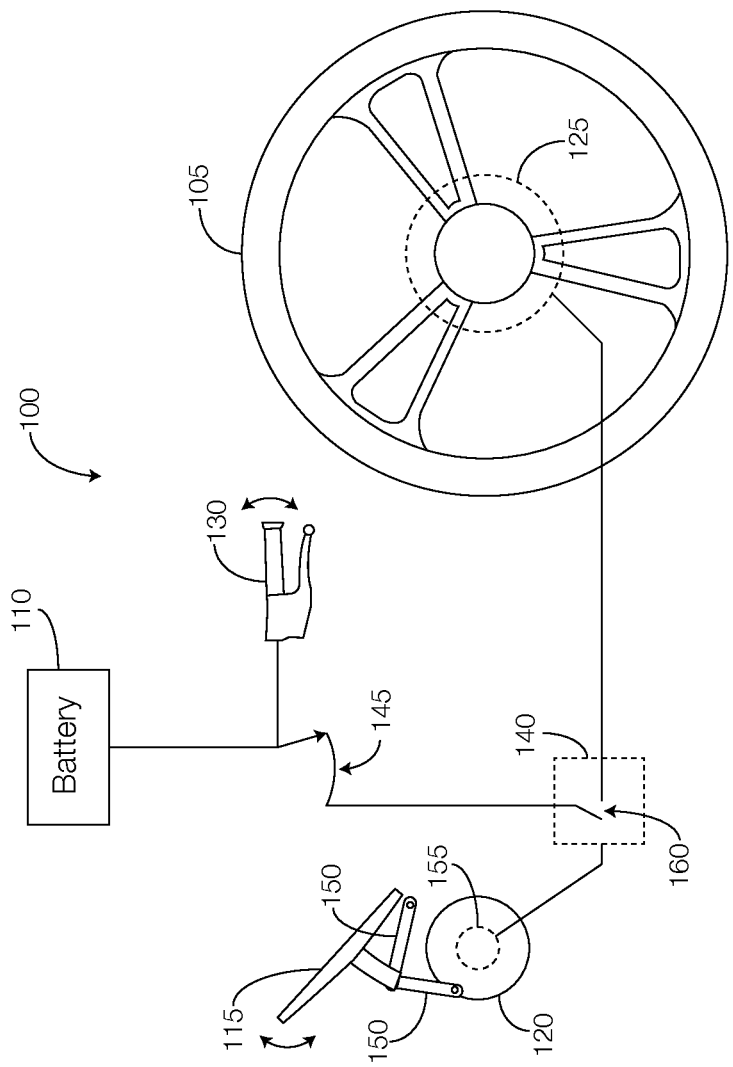
FIG. 2A is a schematic diagram of exemplary components of the bicycle of FIG. 1 when operating under only human power.

FIG. 2A is a schematic diagram of exemplary components of the bicycle 100 of FIG. 1 when operating under only human power. As illustrated, the bicycle 100 includes the bicycle pedals 115, flywheel 120, motor 125, battery 110, and throttle 130 previously discussed. The bicycle 100 shown in FIG. 2 further includes a relay 140 and a potentiometer 145.

The bicycle pedals 115 may move in a reciprocating motion. That is, the pedals 115 may be configured to move from a first position to a second position when actuated by, e.g., a rider of the bicycle 100. The reciprocating pedals 115 may be operably connected to the flywheel 120. As the rider actuates the reciprocating pedals 115 by, e.g., pushing down on the reciprocating pedals 115, arms 150 linking the reciprocating pedals 115 to the flywheel 120 may cause the flywheel 120 to rotate. The pedals may return to their respective initial positions by a spring and allow the flywheel 120 to freewheel, so each push of the pedals 115 may add to the rotational speed of the flywheel 120. As discussed above, the flywheel 120 may be configured to rotate in accordance with the actuation of the bicycle pedals 115. The flywheel 120 may be configured to store rotational energy. The stored energy may be transferred to a generator 155 mechanically connected to the flywheel 120. The generator 155 may be configured to output a rotation signal that indicates that the flywheel 120 is rotating.

The motor 125 may include an electric motor having a stator and a rotor. The rotor may be configured to rotate in accordance with an electrical charge provided to the rotor, the stator, or both. In one possible approach, the rotor may rotate in accordance with a magnetic field generated between the rotor and the stator. The strength of the magnetic field may be related to the amount of current provided to the rotor, the stator, or both.

The battery 110 may be configured to output electrical energy having a particular current, voltage, or both. The battery 110 may include any number of cells that output electrical energy in accordance with a chemical reaction. In some possible approaches, the battery 110 may be rechargeable. The battery 110 may include a nickel-metal hydride (NiMH) battery, a nickel-cadmium (NiCd) battery, a lithium ion (Li-ion) battery, or the like.

The throttle 130 may be configured to control the power provided from the motor 125 to the motor 125. In one possible approach, the throttle 130 may be configured to control the resistance characteristic associated with the potentiometer 145, and therefore, the speed of the motor 125. That is, adjusting the throttle 130 may increase or decrease the resistance characteristic of the potentiometer 145, which may change how much power is output by the battery 110. Since the output of the battery 110 may be used to drive the motor 125, the speed of the motor 125 may be related to the amount of current output by the battery 110. Decreasing the resistance characteristic of the potentiometer 145 may provide the motor 125 with more power (i.e., higher current) while increasing the resistance characteristic of the potentiometer 145 may provide the motor 125 with less power (i.e., lower current).

The relay 140 may include an electrically operated switch 160 configured to open or close in response to a signal. In one possible implementation, the relay 140 may be electrically connected to the generator 155 of the flywheel 120, the battery 110, and the motor 125. The relay 140 may include a normally-open switch 160 configured to close when the rotation signal is received. When closed, the switch 160 may allow current to flow from the battery 110 to the motor 125. The relay 140 may be configured, therefore, to allow power to pass from the battery 110 to the motor 125 while the flywheel 120 is rotating. The switch 160 of the relay 140 of FIG. 2A is open while the bicycle 100 is operating under human power.

Figure 2B:
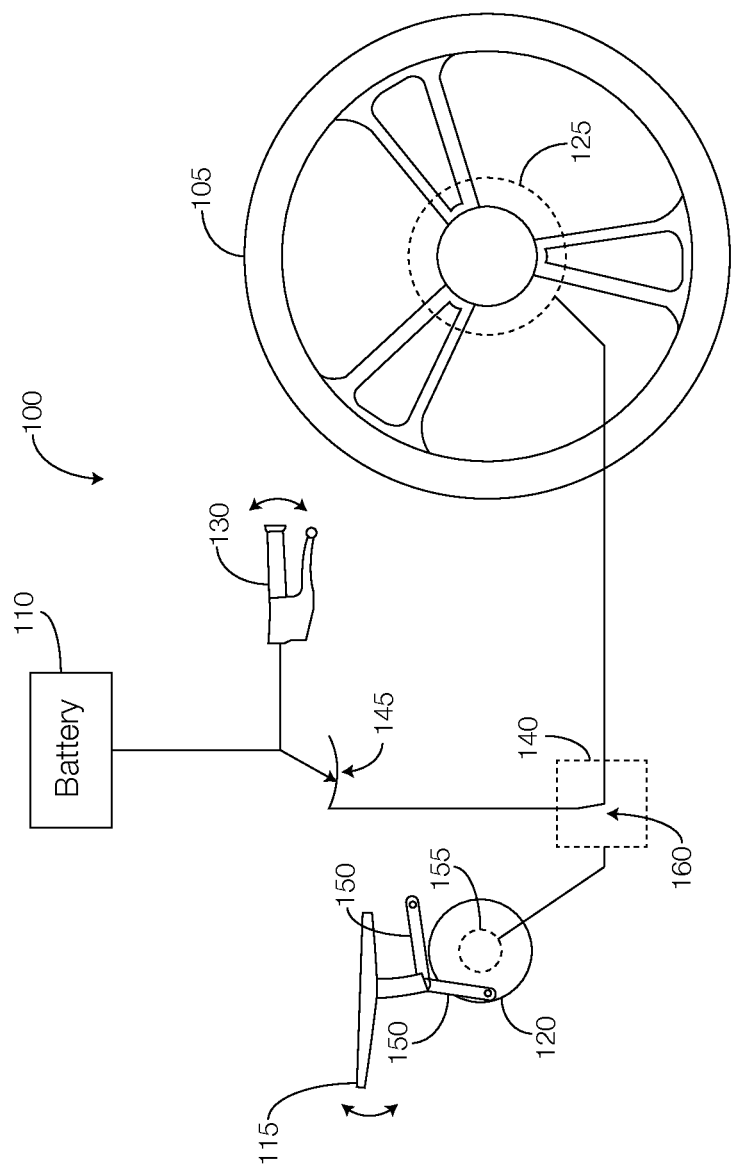
FIG. 2B is a schematic diagram of exemplary components of the bicycle of FIG. 1 when operating under both human and battery power.

FIG. 2B is a schematic diagram of exemplary components of the bicycle 100 of FIG. 1 when operating under both human and battery 110 power. In other words, FIG. 2B represents the instance where the flywheel 120 is rotating and the rider has actuated the throttle 130. Rotating the flywheel 120 by, e.g., pressing the bicycle pedals 115 causes the rotation signal to close the switch 160 of the relay 140. When the switch 160 is closed, the relay 140 electrically may connect the battery 110 to the motor 125. Actuating the throttle 130 may reduce the resistance characteristic of the potentiometer 145. The current, and therefore power, output of the battery 110 may increase as the resistance characteristic drops. Likewise, the current, and therefore power, output of the battery 110 may decrease as the resistance characteristic increases. The throttle 130 may be biased toward a starting position that increases the resistance characteristic of the potentiometer 145. Therefore, when in the starting position (shown in FIG. 2A), no power may pass from the battery 110 to the motor 125. When actuated, as shown in FIG. 2B, power may pass the more the throttle 130 is rotated relative to the starting position. Because the switch 160 of the relay 140 is closed, the additional power output of the battery 110 is provided to the motor 125, causing the motor 125 to rotate the wheel faster, providing an electric assist to the rider of the bicycle 100.

When the rider stops pedaling the bicycle 100, the flywheel 120 will slow and eventually or immediately stop rotating. The amount of time until the flywheel 120 stops rotating may depend upon factors such as friction, including friction from the generator 155. Therefore, the flywheel 120 may continue to rotate for some amount of time after the rider stops pedaling. When the flywheel 120 stops rotating, the generator 155 will cease outputting the rotation signal. Without the rotation signal present, the switch 160 of the relay 140 will open, therefore preventing the battery 110 from powering the motor 125. Accordingly, the battery 110 and motor 125 will cease assisting the rider.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A bicycle comprising:
   at least one pedal;
   a flywheel operably connected to the pedal and configured to rotate in accordance with actuation of the pedal;
   a motor configured to rotate a wheel;
   a battery configured to power the motor; and
   a switch configured to selectively connect the battery to the motor, wherein the switch is configured to close when the flywheel is rotating to provide power from the battery to the motor and wherein the switch is configured to open when the flywheel is not rotating to shut off the motor,
   wherein the flywheel includes a generator configured to generate a rotation signal indicating that the flywheel is rotating, wherein the switch is configured to close in response to receiving the rotation signal and wherein the switch is configured to open in the absence of the rotation signal.

2. The bicycle of claim 1, wherein the pedal includes a reciprocating pedal.

3. The bicycle of claim 1, further comprising
   a throttle; and
   a potentiometer having an adjustable resistance and operably coupled to the throttle.

4. The bicycle of claim 3, wherein the power output by the battery is related to the resistance of the potentiometer.

5. The bicycle of claim 3, wherein the resistance of the potentiometer is adjusted by manipulating the throttle.

6. The bicycle of claim 1, wherein the flywheel is configured to rotate in response to a reciprocating motion of the pedal.

7. A bicycle comprising:
   at least one pedal;
   a flywheel operably connected to the pedal and configured to rotate;
   a motor configured to rotate at least one wheel; and
   a relay operably disposed between the flywheel and the motor, wherein the relay includes a switch configured to close when the flywheel is rotating to pass power to the motor and open when the flywheel is not rotating to shut off the motor,
   wherein the flywheel includes a generator configured to generate a rotation signal indicating that the flywheel is rotating, wherein the switch is configured to close in response to the relay receiving the rotation signal and wherein the switch is configured to open in the absence of the relay receiving the rotation signal.

8. The bicycle of claim 7, wherein the pedal includes a reciprocating pedal.

9. The bicycle of claim 7, further comprising a potentiometer electrically connected to the relay, wherein the potentiometer has an adjustable resistance.

10. The bicycle of claim 9, wherein the power provided to the motor is related to the resistance of the potentiometer.

11. The bicycle of claim 9, wherein the resistance of the potentiometer is adjusted by manipulating a throttle.

12. The bicycle of claim 7, wherein the power to the motor is provided by a battery.

13. The bicycle of claim 7, wherein the flywheel is configured to rotate in response to a reciprocating motion of the pedal.

14. A bicycle comprising:
   at least one reciprocating pedal;
   a flywheel operably connected to the pedal and configured to rotate in response to a reciprocating motion of the reciprocating pedal, the flywheel including a generator configured to generate a rotation signal indicating that the flywheel is rotating;
   a motor configured to rotate a wheel;
   a battery configured to power the motor;
   a throttle configured to electrically connect the battery to the motor; and
   a relay configured to receive the rotation signal, the relay including a switch configured to close in response to the relay receiving the rotation signal indicating that the flywheel is rotating to allow power from the battery to pass to the motor and open in the absence of the relay receiving the rotation signal to shut off the motor.

15. The bicycle of claim 14, further comprising a potentiometer having an adjustable resistance and operably coupled to the throttle.

16. The bicycle of claim 15, wherein the power output by the battery is related to the resistance of the potentiometer.

17. The bicycle of claim 15, wherein the resistance of the potentiometer is adjusted by manipulating the throttle.

* * * * *